(12) United States Patent
Khalsa

(10) Patent No.: US 9,192,033 B2
(45) Date of Patent: Nov. 17, 2015

(54) REMOTE CONTROL OF A LEGACY FLUORESCENT LAMP FIXTURE

(75) Inventor: Kamlapati Khalsa, San Jose, CA (US)

(73) Assignee: Zilog, Inc., Milpitas, CA (US)

(*) Notice: Subject to any disclaimer, the term of this patent is extended or adjusted under 35 U.S.C. 154(b) by 591 days.

(21) Appl. No.: 13/484,804

(22) Filed: May 31, 2012

(65) Prior Publication Data

US 2013/0320877 A1  Dec. 5, 2013

(51) Int. Cl.
| | |
|---|---|
| H05B 41/36 | (2006.01) |
| H05B 41/18 | (2006.01) |
| H05B 37/02 | (2006.01) |
| H05B 41/08 | (2006.01) |

(52) U.S. Cl.
CPC ............ *H05B 41/18* (2013.01); *H05B 37/0227* (2013.01); *H05B 41/08* (2013.01); *Y02B 20/40* (2013.01)

(58) Field of Classification Search
CPC ................................ H05B 41/36; H05B 33/08
USPC ........................................................ 315/246
See application file for complete search history.

(56) References Cited

U.S. PATENT DOCUMENTS

| | | | | |
|---|---|---|---|---|
| 7,291,029 | B2* | 11/2007 | Hale et al. ...................... | 439/236 |
| 8,842,008 | B2* | 9/2014 | Bull .............................. | 340/540 |
| 8,866,401 | B2* | 10/2014 | Shearer et al. ................ | 315/247 |
| 2004/0119415 | A1* | 6/2004 | Lansing et al. ............... | 315/149 |
| 2006/0286841 | A1* | 12/2006 | Hale et al. ..................... | 439/236 |
| 2010/0225240 | A1* | 9/2010 | Shearer et al. ................ | 315/247 |
| 2011/0080091 | A1* | 4/2011 | Staab et al. .................... | 315/61 |
| 2011/0080107 | A1* | 4/2011 | Khalsa et al. ................. | 315/250 |

* cited by examiner

*Primary Examiner* — Alexander H Taningco
*Assistant Examiner* — David Lotter
(74) *Attorney, Agent, or Firm* — Imperium Patent Works; T. Lester Wallace; Amir V. Adibi

(57) ABSTRACT

A legacy-type fluorescent lamp fixture involves a magnetic ballast and a starter unit socket. Power savings are realized by using a retrofit fluorescent lamp assembly in place of the fluorescent lamp that would ordinarily by held in the fixture. The retrofit assembly may, for example, have a smaller fluorescent lamp. A digitally controlled electronic ballast within the retrofit assembly drives the smaller fluorescent lamp efficiently, thereby achieving power savings. In addition, an RF-enabled switch is installed in the starter unit socket. The RF-enabled switch communicates multi-bit digital control signals in serial fashion from the starter socket, through existing wires of the fixture, through the lamp holders of the fixture, and into the retrofit assembly. The electronic ballast receives these signals, decodes them, and in response turns on or turns off its lamp as commanded. Additional power savings are thereby achieved by keeping the lamp off when it is not needed.

20 Claims, 8 Drawing Sheets

LEGACY FLUORESCENT LAMP FIXTURE
WITH MAGNETIC BALLAST AND STARTER

LEGACY FLUORESCENT LAMP FIXTURE
WITH MAGNETIC BALLAST AND STARTER

FLUORESCENT LAMP FIXTURE WITH
ELECTRONIC BALLAST

T8-TO-T5 RETROFIT ASSEMBLY

RF-ENABLED T8-TO-T5
RETROFIT ASSEMBLY

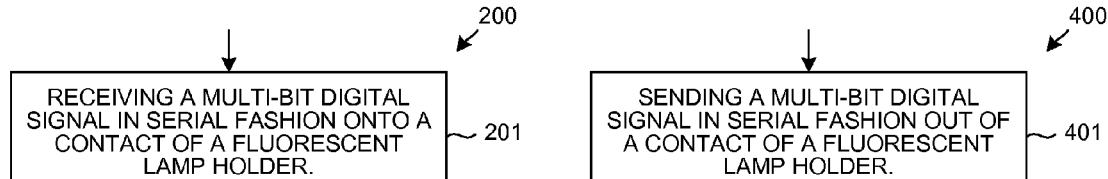
FIG. 14
FIG. 16
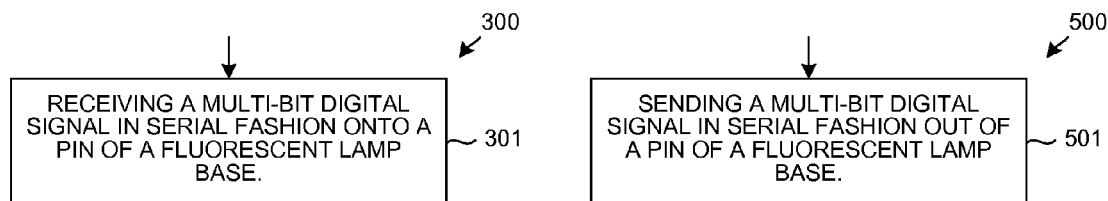
FIG. 15
FIG. 17
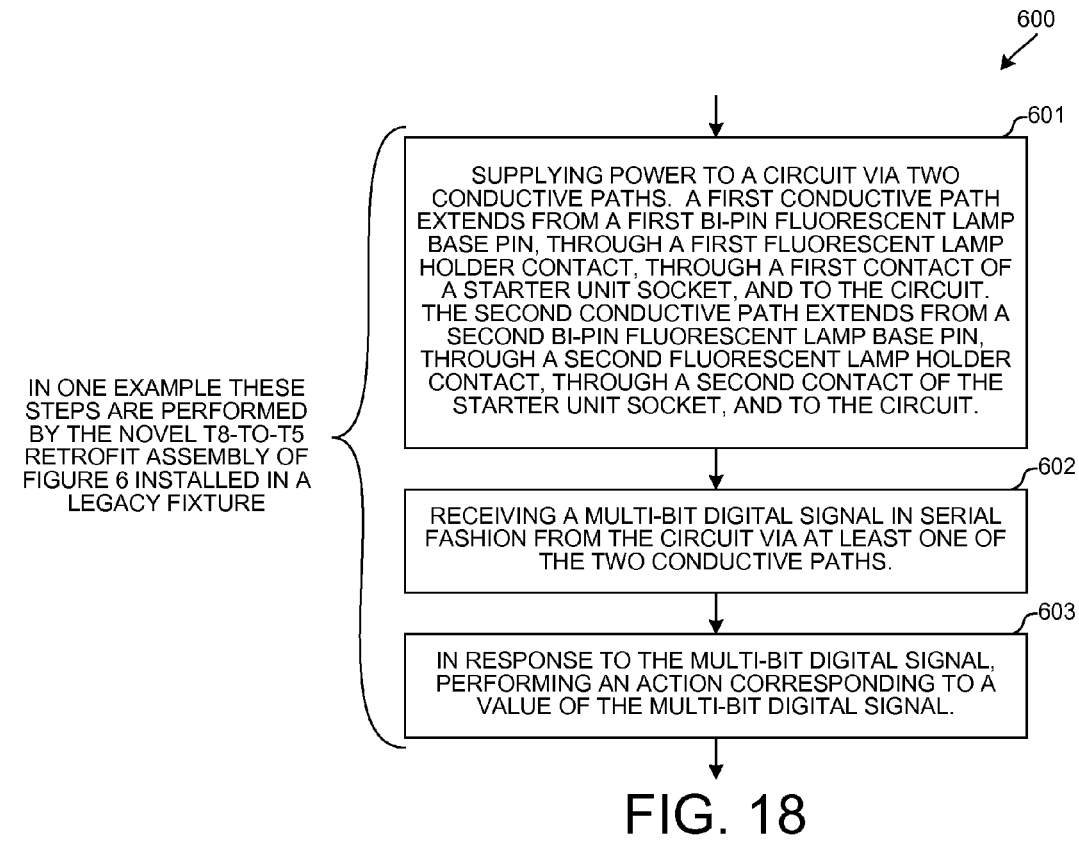
FIG. 18

REMOTE CONTROL OF A LEGACY FLUORESCENT LAMP FIXTURE

TECHNICAL FIELD

The described embodiments relate to fluorescent lamp fixtures, to retrofit fluorescent lamp assemblies, and to associated methods.

BACKGROUND INFORMATION

FIG. 1 (Prior Art) is an exploded perspective view of an assembly involving one type of fluorescent lamp fixture referred to here as an old-fashioned or a "legacy" fluorescent lamp fixture. FIG. 2 (Prior Art) is a circuit schematic of the assembly of FIG. 1. Legacy fixture 1 includes a base portion 2, a transparent cover or lens 3, and a starter unit 5. Base portion 2 of the fixture includes a pair of T8 lamp holders 6 and 7, a starter socket 8, a magnetic ballast 9 that is disposed under a removable metal cover or tent 10, and other parts not shown. A fluorescent lamp 4 is installed in the fixture. Fixture 1 receives AC power via electrical cord 11. In one example, the fluorescent lamp 4 is a so-called T8 tubular fluorescent lamp having opposing G13 bi-pin bases 12 and 13. The T8 lamp is installed in the fixture so that the two pins of G13 bi-pin base 12 fit into lamp holder 6 and make contact with two corresponding electrical contacts in lamp holder 6. Similarly, the two pins of G13 bi-pin base 13 fit into lamp holder 7 and make contact with two corresponding electrical contacts in lamp holder 7. When starter unit 5 is installed, the two terminals of the starter unit fit up and into corresponding holes in starter socket 8 and make electrical connections to two corresponding electrical contacts in the socket.

As is known in the art, a starter unit is required to turn on the lamp. In a first step, when AC power is applied to the fixture via cord 11, a switch in starter unit 5 closes and forms an electrical connection between the filament 14 at one end of lamp 4 and the filament 15 at the other end of lamp 4. An alternating current can then flow from an AC power source 16, through inductive ballast 9, through filament 14, through the closed switch of the starter unit 5, and through the second filament 15, and back to the AC power source 16. This flow of this current causes the filaments to heat. The heating of the filaments causes gas surrounding the filaments to ionize. Once the gas is ionized in this way, then the switch in the starter unit is opened. The opening of the switch cuts current flow through magnetic ballast 9, thereby causing a large voltage spike to develop due to the inductive nature of the ballast. Due to the circuit topology, this large voltage is present between filaments 14 and 15. The voltage is large enough to strike an arc between the filaments through the gas within the lamp. Once the arc is established, the resistance between the two filaments through the gas decreases. This allows current to continue to flow through the gas without a large voltage being present between the filaments. The switch of the starter unit is left open, the current continues to flow, filaments continue to be heated, the arc is maintained, and the magnitude of current flow is limited by the ballast. The fluorescent lamp is then said to be on. The arc generates UV light that then strikes a phosphor coating on the inside surface of the glass of the lamp. The phosphor coating captures energy of the UV light and reemits visible light.

FIG. 3 (Prior Art) is a circuit diagram of an assembly involving another type of fluorescent lamp fixture 20. This type of fixture employs an electronic ballast 21. Due to the operation of the electronic ballast, no separate starter unit is provided. Wires 23-26 and lamp holders 27 and 28 are parts of the fixture. Electronic ballast 21 receives 50-60 Hz AC power from AC source 16, and then supplies a T8 fluorescent lamp 22 with an AC power signal having a higher frequency (for example, 20 kHz). Fluorescent lamps are generally more efficient in terms of converting electrical energy into visible light when they are driven at a higher frequency such as 20 kHz as opposed to when they are driven with an AC signal at 50-60 Hz. For these and other reasons, new fluorescent lamps fixtures are generally of the electronic ballast type. Legacy type fixtures as shown in FIG. 1 still exist, but generally are older fixtures that have been installed and in use for some time.

FIG. 4 (Prior Art) is a circuit diagram of an assembly in which a so-called "T8-to-T5 retrofit assembly" 30 has been installed in a legacy fluorescent lamp fixture. The T8-to-T5 retrofit assembly 30 has the approximate form factor of an ordinary T8 fluorescent lamp. In this form factor, the T8-to-T5 retrofit assembly 30 provides two G13 bi-pin bases 31 and 32 mounted in opposing fashion as illustrated so that the T8-to-T5 retrofit assembly 30 can be installed in lamp holders 33 and 34 in place of a T8 lamp. In addition, retrofit assembly 30 includes an electronic ballast 35, a T5 fluorescent lamp 36, and two T5 lamp holders 37 and 38 configured to hold the T5 lamp. The electronic ballast 35 receives 50-60 Hz AC power from AC source 16. A first conductive path extends from AC source 16, through ballast 39, through wire 40 of the legacy fixture, through contact 41 of lamp holder 33, and into the T8-to-T5 retrofit assembly, and to a first power input of electronic ballast 35. A second conductive path extends from AC source 16, through wire 42 of the legacy fixture, through contact 43 of lamp holder 34, into the T8-to-T5 retrofit assembly, through a short connection 44 within the retrofit assembly, back out of the T8-to-T5 retrofit assembly via contact 54 of lamp holder 34, through wire 45 of the legacy fixture, through a dummy short 46 that is installed in starter socket 47, through wire 48 of the legacy fixture, through contact 49 of lamp holder 33, back into the retrofit assembly, and to a second power input of electronic ballast 35. The electronic ballast receives AC power through these two conductive paths. The electronic ballast drives the T5 fluorescent lamp 36 via four conductors 50-53. The existence of magnetic ballast 39 in the AC current path between AC source 16 and electronic ballast 35 does not interfere with operation of the electronic ballast. The magnetic ballast is of such an inductance that at the low 50-60 Hz frequency of the incoming AC power signal, the magnetic ballast has only a small impedance. By replacing a T8 lamp of a legacy fixture with such a T8-to-T5 retrofit assembly, power savings due to more efficient operation of the lamp can be realized. The fact that the smaller T5 lamp may output less light than the original larger T8 lamp is generally acceptable considering the improved efficiency gained.

FIG. 5 (Prior Art) is a circuit diagram of a proposed circuit whereby an owner of a legacy fixture 55 can achieve even more power savings as compared to using the circuit of FIG. 4. In the assembly of FIG. 5, an RF-enabled switch 56 is provided in the starter unit socket 57 of the legacy fixture. The internal wiring of the legacy fixture of the circuit of FIG. 5 is identical to the internal wiring of the legacy fixture of FIG. 1. The T8-to-T5 retrofit assembly 61 of FIG. 5 is identical to the T8-to-T5 retrofit assembly 30 of FIG. 4. The legacy fixture is generally a fixture that has been installed and used with T8 bulbs for many years, and is now being retrofitted to improve efficiency.

In the assembly of FIG. 5, the circuitry of the RF-enabled switch 56 receives power via existing conductors 58 and 59 of the legacy fixture. A switch in the RF-enabled switch 56 can be made to open in response to receiving an RF control signal 60. If the switch is open, then power to the retrofit assembly 61 is cut off, lamp 62 is therefore off and is not powered. The switch in the RF-enabled switch 56 can also be made to close in response to receiving another RF control signal 63. If the switch is closed, then power is supplied through the RF-enabled switch 56 and to the retrofit assembly 61. The retrofit assembly 61 responds in standard fashion and drives lamp 62 so that lamp 62 is illuminated. By turning the lamp off when light is not needed, additional power savings can be realized in addition to the power savings achieved by simple use of the retrofit assembly.

In one example, the circuit of FIG. 5 is installed in a room. A remotely located infra-red occupancy detector circuit (not shown) detects whether there are people in the room. If no people are detected and it is determined that light from lamp 62 is not needed, then the infra-red occupancy detector circuit transmits RF control signal 60 to the RF-enabled switch 56 thereby causing lamp 62 to be turned off. If, however, people are detected to be in the room, then the infra-red occupancy detector circuit may transmit RF control signal 63 to the RF-enabled switch 56 thereby causing lamp 62 to be turned on. By keeping the lamp 62 off when it is not needed, the circuit of FIG. 5 achieves additional power savings as compared to the circuit of FIG. 4.

SUMMARY

A legacy-type fluorescent lamp fixture involves a magnetic ballast and a starter unit socket. Rather than a fluorescent lamp being held between two fluorescent lamp holders of the fixture in conventional fashion, a novel retrofit fluorescent lamp assembly is installed in place of the fluorescent lamp. The retrofit fluorescent lamp assembly is held by the two fluorescent lamp holders in the same way that an ordinary fluorescent lamp would have been held. In addition, an RF-enabled switch is installed in the starter socket of the fixture. AC power from an AC power source (for example, 120 VAC @ 60 Hz wall power or 240 VAC @ 50 Hz wall power) is received onto the retrofit fluorescent lamp assembly via two conductive paths and is used to power a lamp of the retrofit fluorescent lamp assembly. A first conductive path extends from the AC power source, through the magnetic ballast, through a first contact of a first lamp holder, through a first pin of a first bi-pin base of the retrofit fluorescent lamp assembly, and to a first AC power input of a digitally controllable electronic ballast of the retrofit fluorescent lamp assembly. A second conductive path extends from the AC power source, through a first contact of a second lamp holder, through a first pin of a second bi-pin base of the retrofit fluorescent lamp assembly, and to a second AC power input of the digitally controllable electronic ballast of the retrofit fluorescent lamp assembly. The other two pins of the bi-pin bases of the retrofit fluorescent lamp assembly, namely the second pin of the first bi-pin base and the second pin of the second bi-pin base, are used to communicate multi-bit digital control signals between the starter socket and the retrofit fluorescent lamp assembly. A pair of preexisting wires of the legacy type fixture extend from these second pins of the bi-pin bases to the two contacts of the starter socket. No changing of the wiring of the legacy type fixture is required to accommodate the retrofit assembly and the RF-enabled switch in this way.

In one specific example, a remotely located infra-red occupancy detector and the fixture are disposed in a room to be illuminated. The occupancy detector determines that the room is occupied and that the lamp of the fixture should be illuminated. The occupancy detector therefore transmits a first RF signal to the RF-enabled switch. In response, the RF-enabled switch sends a first multi-bit digital control signal out of the starter socket and via the second pin of the second bi-pin base of the retrofit assembly into the retrofit lamp assembly and to the digitally controllable electronic ballast of the retrofit assembly. The digitally controllable electronic ballast decodes the first multi-bit digital control signal and in response turns on the lamp of the retrofit assembly. In another example, the occupancy detector determines that the room is vacant. The occupancy detector therefore transmits a second RF signal to the RF-enabled switch. In response, the RF-enabled switch sends a second multi-bit digital control signal out of the starter socket and via the second pin of the second bi-pin base of the retrofit assembly into the retrofit lamp assembly and to the digitally controllable electronic ballast. The digitally controllable electronic ballast decodes the second multi-bit digital control signal and in response turns off the lamp. The first pins of the first and second bi-pin bases of the retrofit assembly are used to receive AC power onto the retrofit assembly. These two pins are not used to communicate the multi-bit digital control signals. The second pins of the first and second bi-pin bases of the retrofit assembly are used to communicate the multi-bit digital control signals and are not used to receive AC power onto the retrofit assembly.

In one specific example, the retrofit assembly sources a DC voltage through a resistance. This DC voltage is sourced out of the second pins of the first and second bi-pin bases. The DC voltage is present between the second pins of the first and second bi-pin bases provided that a switch of the RF-enabled switch is not closed and coupling the second pins of the first and second bi-pin bases together. Circuitry of the RF-enabled switch is powered by this DC voltage. If the switch of the RF-enabled switch is closed and coupling the second pins of the first and second bi-pin bases together, then the voltage on the second pin of the second bi-pin base is pulled down toward ground potential (ground potential is present on the second pin of the first bi-pin base) through the sourcing resistance. The changing voltage levels on the second pin of the second bi-pin base as the switch of the RF-enabled switch is opened and closed are detected by the digitally controllable ballast as the multi-bit digital signal. The overall assembly involving the legacy-type fluorescent lamp fixture, the novel retrofit lamp assembly, the lamp held by the retrofit lamp assembly, and the RF-enabled switch promotes power savings in driving the lamp, as compared to driving a lamp with a conventional retrofit lamp assembly, both: 1) due to driving the lamp of the retrofit assembly efficiently when the lamp is on, and 2) due to turning the lamp off when light from the lamp is not needed. These savings can be achieved with a legacy-type fluorescent lamp fixture without making any modifications to the wiring of the fixture itself. All that is required is the replacement of the conventional fluorescent lamp with the novel retrofit assembly and the installation of a suitable controllable switch (for example, the RF-enabled switch) in the starter socket of the fixture. Although in some embodiments the retrofit assembly holds and powers a fluorescent lamp as described above, in other embodiments the retrofit assembly holds and powers another type of lighting element such as, for example, an LED light emitting element or an incandescent light emitting element. Although an RF-enabled switch is described as one way of injecting digital signals into the retrofit assembly via the starter socket, other circuits and digital signaling schemes can be employed to communicate digital signals with the retrofit assembly using the starter socket as a communication port. Digital communication through the starter socket can be bidirectional.

Further details and embodiments and techniques and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 14 is a flowchart of a method 200 in accordance with one novel aspect.

FIG. 15 is a flowchart of a method 300 in accordance with one novel aspect.

FIG. 16 is a flowchart of a method 400 in accordance with one novel aspect.

FIG. 17 is a flowchart of a method 500 in accordance with one novel aspect.

FIG. 18 is a flowchart of a method 600 in accordance with one novel aspect.

DETAILED DESCRIPTION

The accompanying drawings, where like numerals indicate like components, illustrate embodiments of the invention.

Figure 1:
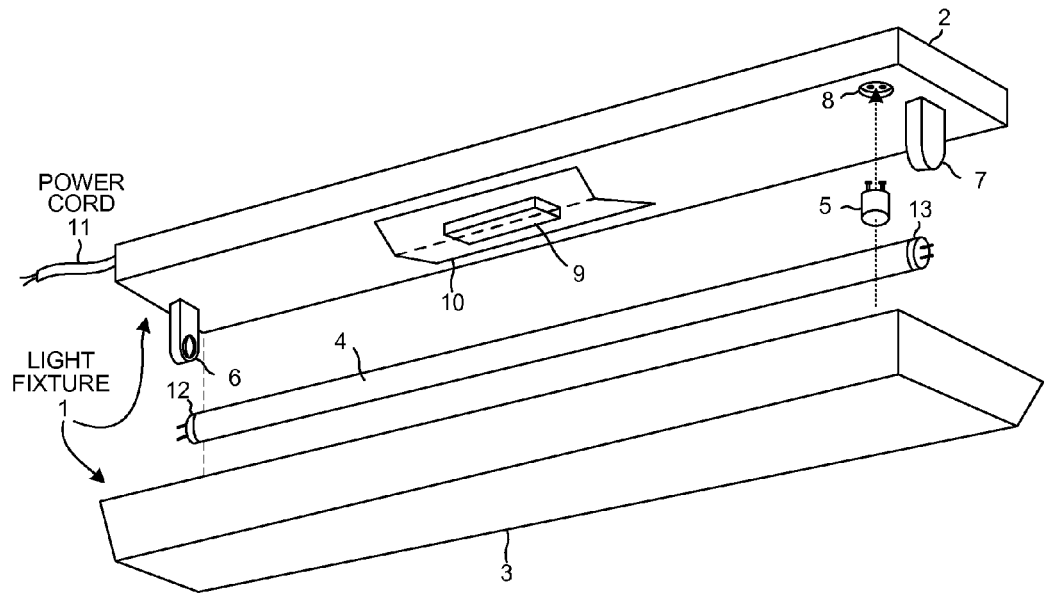
FIG. 1 (Prior Art) is an exploded perspective view of an assembly involving a legacy fluorescent lamp fixture having a magnetic ballast and a starter socket.
Figure 2:
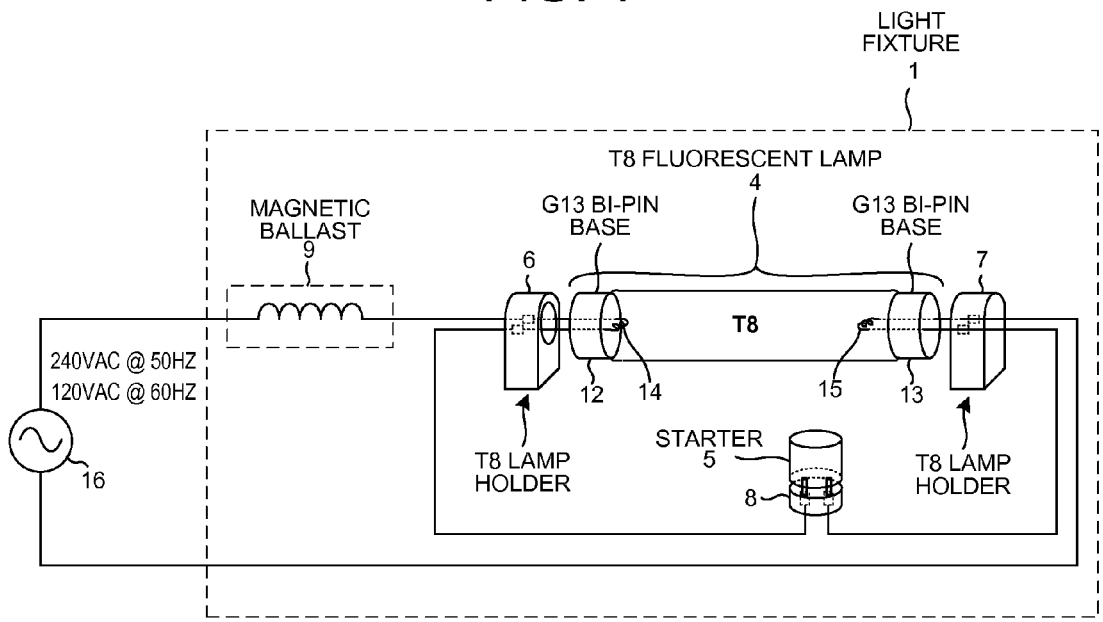
FIG. 2 (Prior Art) is a circuit schematic of the assembly of FIG. 1.
Figure 3:
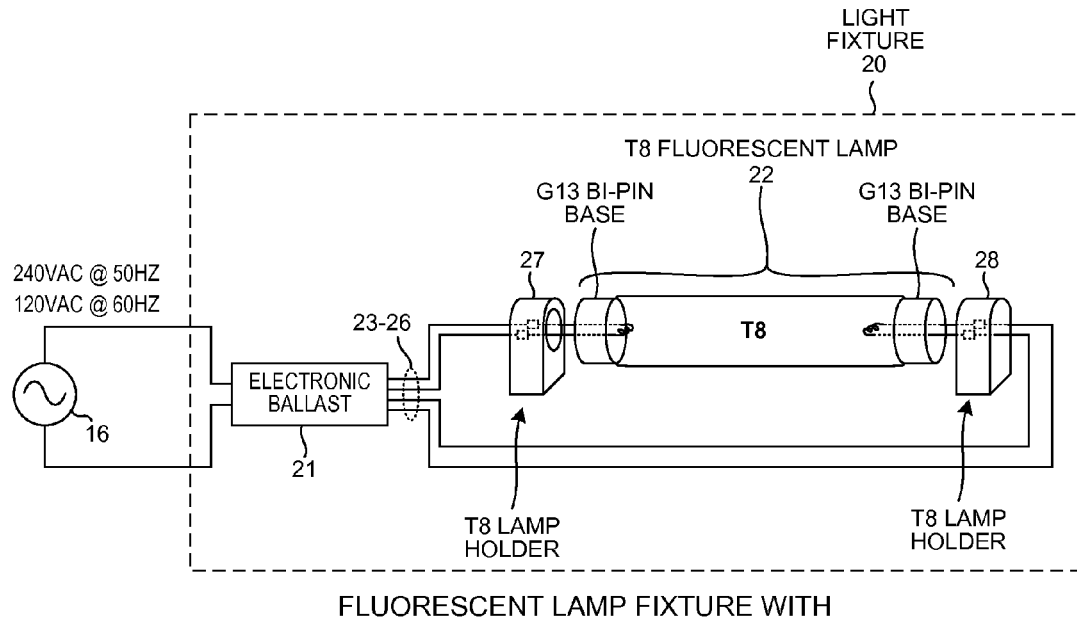
FIG. 3 (Prior Art) is a circuit diagram of an assembly involving a type of fluorescent lamp fixture having an electronic ballast.
Figure 4:
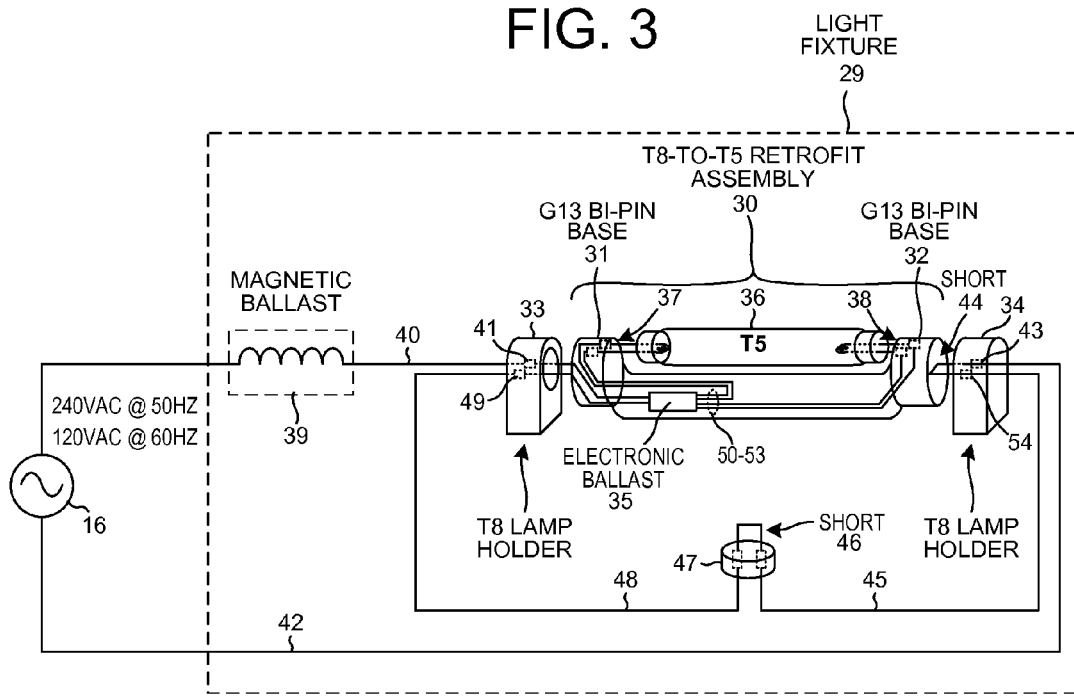
FIG. 4 (Prior Art) is a circuit diagram of an assembly in which a retrofit assembly has been installed in a legacy fluorescent lamp fixture.
Figure 6:
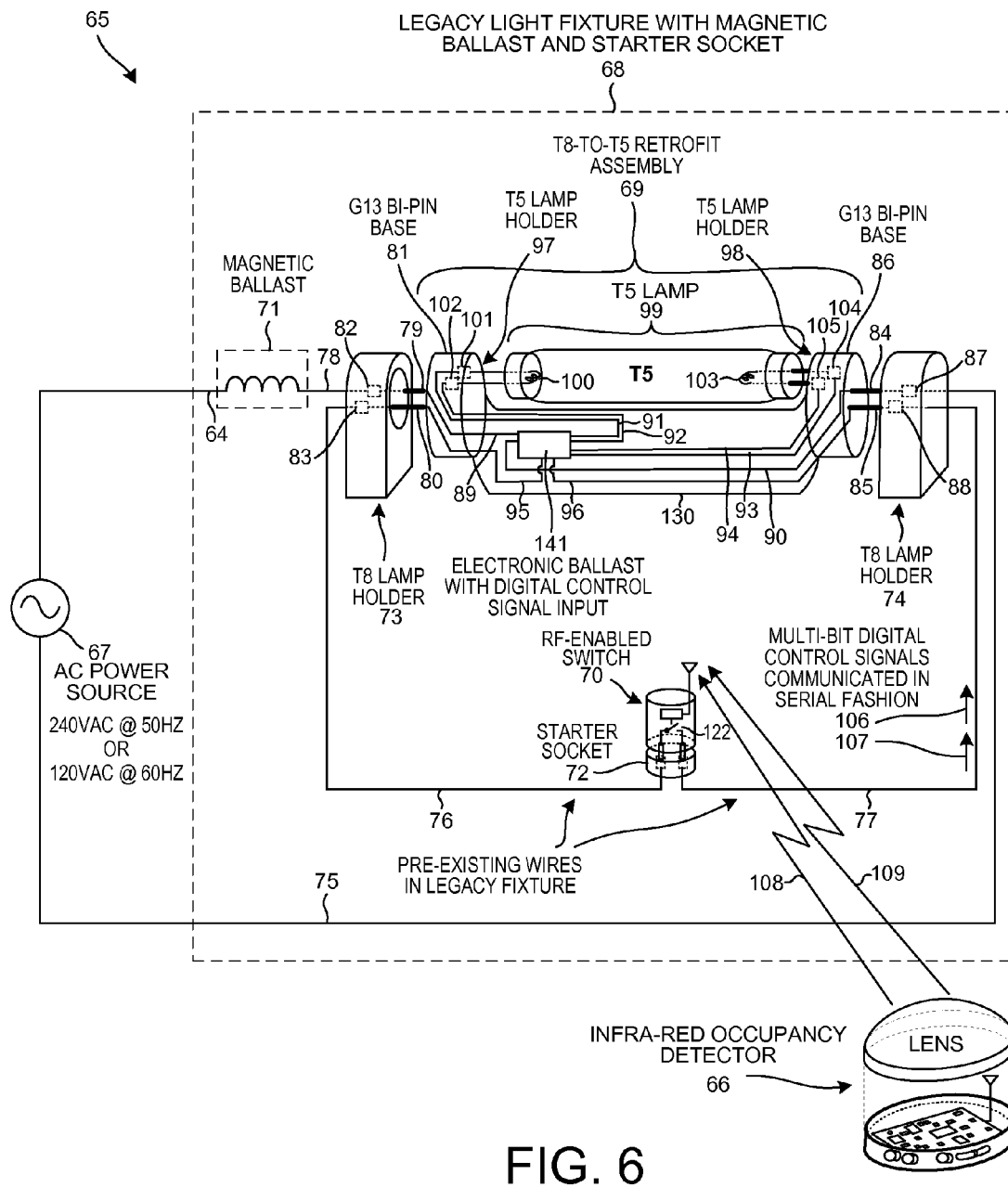
FIG. 6 is a diagram of an assembly 65 in accordance with one novel aspect. The assembly 65 involves a novel retrofit fluorescent lamp assembly and an RF-enabled switch that are installed in a legacy fixture.

FIG. 6 is a diagram of an assembly 65 in accordance with one novel aspect. Overall assembly 65 includes a RF-communicating remote device 66 (such as an infra-red occupancy detector having an RF communicating capability), an AC power source 67, a light fixture 68, a novel T8-to-T5 retrofit assembly 69, and a novel RF-enabled switch 70. Light fixture 68 is a legacy-type fluorescent lamp fixture that includes a magnetic ballast 71, a starter socket 72 for accommodating a conventional starter unit, two T8 lamp holders 73 and 74 positioned to hold a T8 fluorescent lamp, and associated wires or connections 64, 75, 76, 77 and 78. The legacy fixture 68 is identical to the legacy fixture 1 of FIG. 1 and includes a base portion, a removable cover for the ballast, and a transparent cover or lens as pictured in FIG. 1. The legacy fixture can take on many different forms. The form of FIG. 1 is just one example.

Rather than a T8 fluorescent lamp being installed in conventional fashion in the T8 lamp holders 73 and 74, the novel T8-to-T5 retrofit assembly 69 is installed in the place of the T8 fluorescent lamp. Pins 79 and 80 of a first G13 bi-pin base 81 of the retrofit assembly make electrical contact with corresponding electrical contacts 82 and 83 of T8 lamp holder 73, respectively. Similarly, pins 84 and 85 of a second G13 bi-pin base 86 of the retrofit assembly make electrical contact with corresponding electrical contacts 87 and 88 of T8 lamp holder 74, respectively. The novel T8-to-T5 retrofit assembly 69 includes the two G13 bi-pins bases 81 and 86, a supporting base member 130, a novel digitally controllable electronic ballast 141, wires or connections 89-96, and two T5 lamp holders 97 and 98. A T5 fluorescent lamp 99 is installed in the retrofit assembly so that it is held by T5 lamp holders 97 and 98. The bi-pin bases 81 and 86 and ballast 141 are mounted to the base member 130. All these components are interconnected as illustrated in FIG. 6.

The novel digitally controlled electronic ballast 141, along with its associated wiring, properly interconnected, is an example of what is referred to here as a lamp drive circuit. The digitally controllable electronic ballast 141 drives leftmost filament 100 via wire or conductor 91, contact 101, a first pin of the leftmost G5 bi-pin base of the T5 lamp 99, the filament 100, a second pin of the leftmost G5 bi-pin base of the T5 lamp 99, contact 102, and wire or conductor 92. Digitally controllable electronic ballast 141 drives filament 103 via wire or conductor 93, contact 104, a first pin of the rightmost G5 bi-pin base of the T5 lamp 99, the filament 103, a second pin of the rightmost G5 bi-pin base of the T5 lamp 99, contact 105, and wire or conductor 94.

Figure 5:
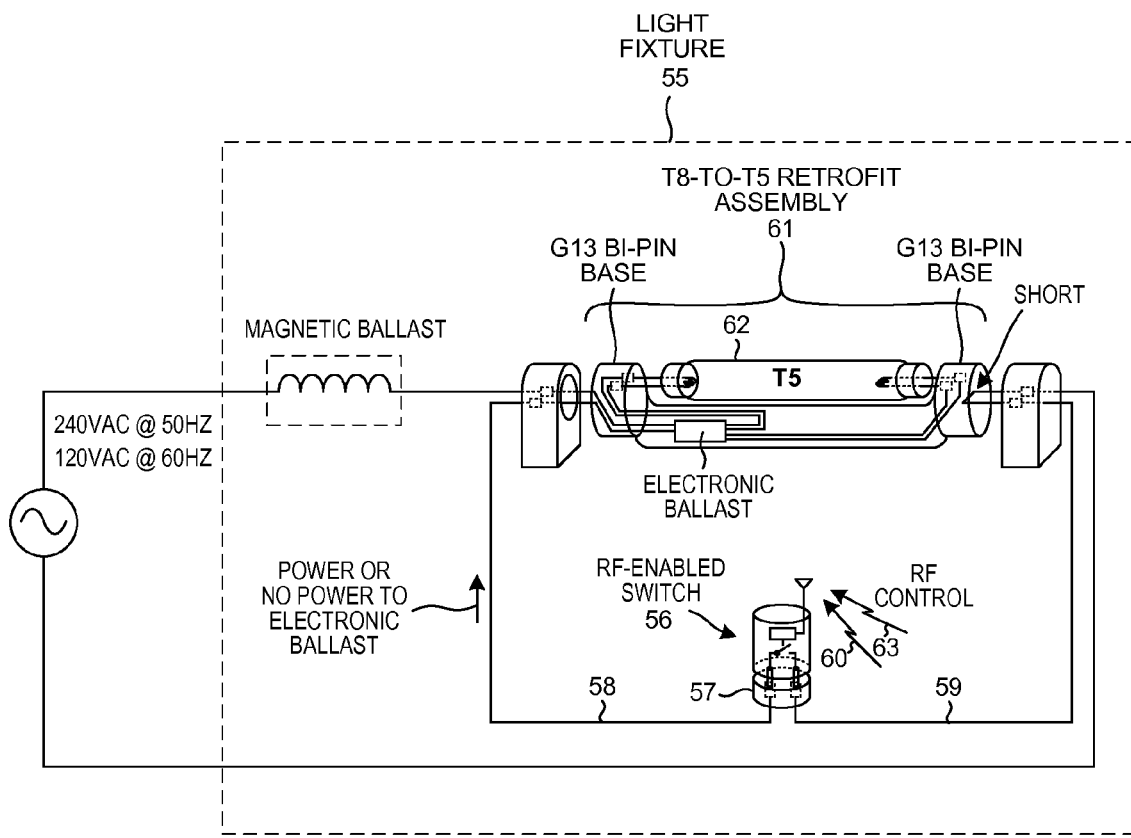
FIG. 5 (Prior Art) is a circuit diagram of a proposed circuit.

Rather than the RF-enabled switch trying to turn on and off the lamp by supplying AC power or not supplying AC power to the retrofit assembly as in the proposed circuit of FIG. 5, AC power for the retrofit assembly does not pass through RF-enabled switch 70. Heating problems and reliability problems are avoided by not conducting high currents through switch 70. Switch 70 is therefore made less expensively. To accomplish this, one of the pins 79 of G13 bi-pin base 81 is coupled by wire or conductor 89 to a first power input of electronic ballast 141 and one of the pins 84 of G13 bi-pin base 86 is coupled by wire or conductor 90 to a second power input of electronic ballast 141. AC power to the retrofit assembly 69 therefore can be supplied by the fixture and to the retrofit assembly 69 without the AC power that drives the lamp 99 flowing through pins 80 and 85, through wires or conductors 76 and 77, through starter socket 72, or through RF-enabled switch 70. Within retrofit assembly 69, pin 80 of G13 bi-pin base 81 is coupled by wire or conductor 95 to a first digital signal input of electronic ballast 141, and pin 85 of G13 bi-pin base 86 is coupled by wire or conductor 96 to a second digital signal input of electronic ballast 141. Pins 80 and 85 are not needed to supply AC power to the retrofit assembly. In the example of FIG. 6, pins 80 and 85 are used: 1) to supply a relatively small amount of power from retrofit assembly 69 to RF-enabled switch 70 to power circuitry in switch 70, and 2) to receive multi-bit digital control signals 106 and 107 from RF-enabled switch 70. The multi-bit digital control signals 106 and 107 are communicated in serial fashion from RF-enabled switch 70, through a contact of starter socket 72, through wire or conductor 77, through contact 88 of lamp holder 74, through pin 85 of G13 bi-pin base 86 of the retrofit assembly, through wire or conductor 96 to the second digital signal input of electronic ballast 141. Wire or conductor 76 in this example is used as a ground connection, both for power purposes and for signaling purposes. Wires or conductors 76 and 77 are pre-existing wires or conductors of the legacy fixture. No changing of the wiring of the legacy fixture is required to provide the communication path for communicating multi-bit digital control signals between socket 72 and electronic ballast 141.

In one example, remote infra-red occupancy detector 66 detects motion and determines that lamp 99 is to be turned on. It therefore transmits an RF control signal 108 to RF-enabled switch 70. RF-enabled switch 70 in turn sends multi-bit digital control signal 106 through socket 72 and wire or connection 77 to the digitally controlled electronic ballast 141. The digitally controlled electronic ballast 141 receives the multi-bit digital control signal 106, decodes the multi-bit digital control signal and determines that the signal is an ON command, and in response turns lamp 99 on. Later, remote infrared occupancy detector 66 determines that lamp 99 is to be turned off. This may, for example, be due to the occupancy detector not detecting motion for a period of time. Occupancy detector 66 transmits an RF control signal 109 to RF-enabled switch 70. RF-enabled switch 70 in turn sends multi-bit digital control signal 107 through socket 72 and wire or connection 77 to the digitally controlled electronic ballast 141. The digitally controlled electronic ballast 141 receives the multi-bit digital control signal 107, decodes the signal and determines that the signal is an OFF command, and in response turns off lamp 99. Occupancy detector 66 can cause lamp 99 to be turned on and turned off in this way.

Although in this illustrated example the communication path through the starter socket 72 is used to communicate ON and OFF commands in unidirectional fashion, in other examples the communication path between starter socket 72 and the ballast 141 is usable to communicate other digital information and other commands, both into the retrofit assembly and/or out of the retrofit assembly. One of many different serial protocols and error detecting schemes can be used. RF-enabled switch 70 is but one way of communicating multi-bit digital signals through socket 72. A circuit other than an RF-enabled switch can be employed for this purpose. The circuit that communicates signals through the socket need not be RF-enabled, and need not have the form factor of a starter unit. Although single-ended signaling is described in the example of FIG. 6 as the way that the multi-bit digital signals are communicated, differential signaling may be employed to communicate the multi-bit digital signals in other examples. Although power is supplied through the socket 72 in the example of FIG. 6 to power RF-enabled switch 70, in other examples the circuit that communicates through socket 72 is not powered through the socket. Although the retrofit assembly 69 involves driving a fluorescent lamp in the example of FIG. 6, the retrofit assembly in other examples may have other functions. In one example, the retrofit assembly does not power a fluorescent lamp, but rather has a lighting element involving LEDs (Light Emitting Diodes). Power electronics for supplying the proper supply voltage to the LEDs receives AC power through pins 79 and 84, whereas the other pins 80 and 85 of the retrofit assembly are used to send and/or to receive digital signals to/from the retrofit assembly via existing wires 76 and 77 and socket 72.

Figure 7:
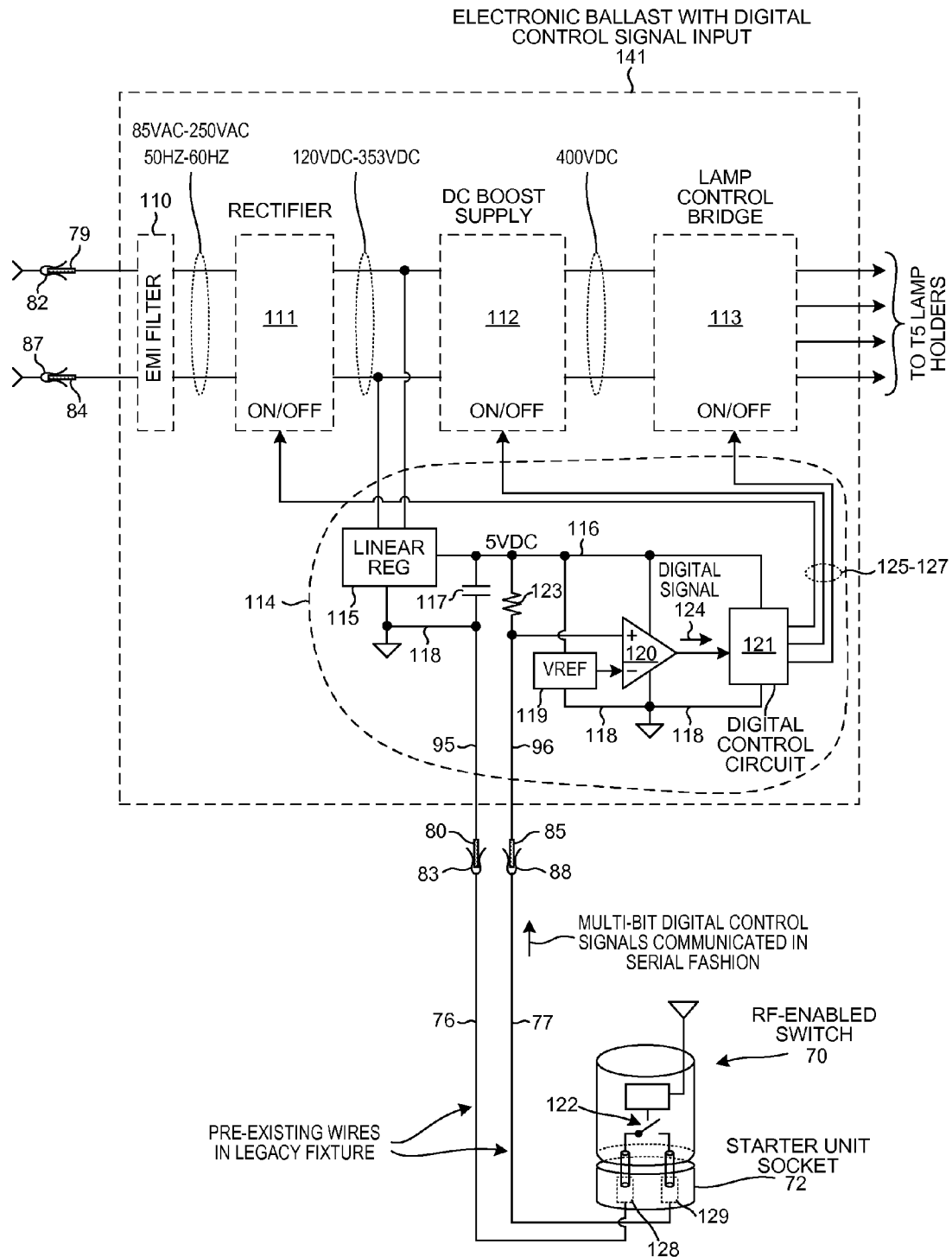
FIG. 7 is a circuit diagram showing the digitally controllable electronic ballast of the retrofit assembly of FIG. 6 in further detail.

FIG. 7 is a more detailed diagram of one specific example of the digitally controlled electronic ballast 141 of FIG. 6. Ballast 141 includes an EMI filter 110, a rectifier stage 111, a DC boost supply stage 112, a lamp control bridge stage 113, and digital control signal communication circuitry 114. Rectifier stage 111 converts 85 VAC to 250 VAC incoming AC wall power into a rectified DC supply voltage of a corresponding magnitude of 120 VDC to 353 VDC. DC boost supply stage 112 is a DC-to-DC switching power supply that converts the 120 volt to 353 volt DC supply voltage from the rectifier stage into a DC supply voltage of a higher voltage such as, for example, 400 volts DC. Lamp control bridge 113 switches the 400 volt DC signal onto the contacts of the T5 lamp holders as appropriate to drive the T5 fluorescent lamp. The composition and design of stages 110-113 are understood by those of skill in the art. There are variations of the circuitry that can be used in the various stages. Often several or all of the stages are provided with digital on/off control so that the various stages can be powered up and/or down in a particular sequence. In the example of FIG. 7, digital control signal communication circuitry 114 uses the on/off control mechanisms of the stages to turn on and to turn off lamp 99. A low output power linear regulator 115 converts a larger voltage DC supply voltage as output by rectifier stage 111 into a regulated 5.0 volt DC supply voltage on voltage supply conductor 116. Bypass and storage capacitor 117 is coupled between supply conductor 116 and ground conductor 118 across the outputs of the linear regulator. The 5.0 volt DC supply voltage output by the linear regulator powers a voltage reference circuit 119, a comparator 120, and a digital control circuit 121. The 5.0 volt DC signal is also sourced out of the retrofit assembly onto pin 85 through resistor 123. If switch 122 in RF-enabled switch 70 is open, then there is no voltage drop across resistor 123 and 5.0 volt DC is present on wire or conductor 96. If, on the other hand, the switch 122 in RF-enabled switch 70 is closed then the voltage on wire or conductor 96 is lower than 5.0 volts DC. Signaling voltages are relative to the voltage on wire or conductor 95. The state of switch 122 in the RF-enabled switch 70 therefore controls the voltage on the non-inverting input lead of comparator 120. Comparator 120 compares the voltage on its non-inverting input lead to a reference voltage. The reference voltage is supplied by voltage reference circuit 119 onto the inverting input lead of comparator 120. Comparator 120 outputs a digital signal 124 indicative of the state of switch 122. Digital control circuit 121 (which may be a microcontroller) receives digital signal 124, deserializes and decodes it to determine its information content, and then turns on or off lamp 99 as appropriate by sending ON/OFF digital controls signals to one or more of the stages 111-113 via one or more of conductors 125-127. Reference numerals 128 and 129 identify contacts in the starter socket 72 that are coupled to wires or conductors 76 and 77, respectively.

Figure 8:
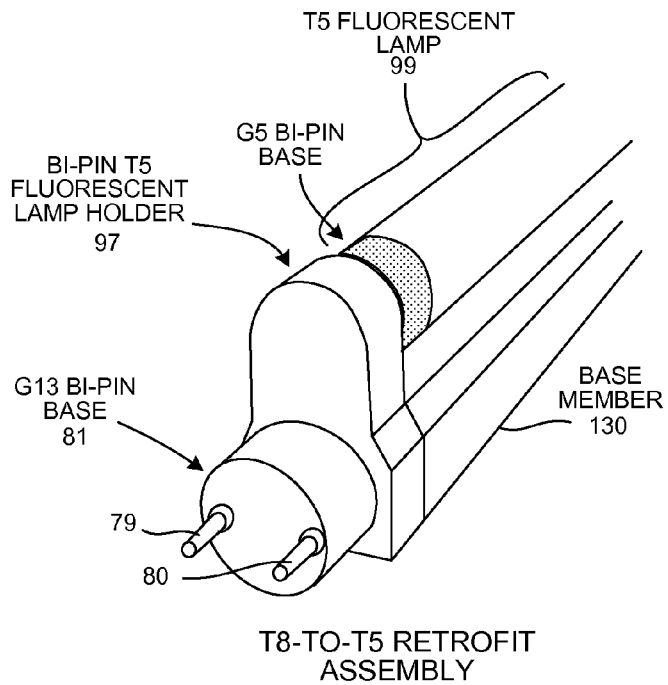
FIG. 8 is a perspective view of the leftmost end of the retrofit assembly of FIG. 6.

FIG. 8 is a perspective view of the leftmost end of the T8-to-T5 retrofit assembly 69 of FIG. 6.

Figures 9, 10, 11:
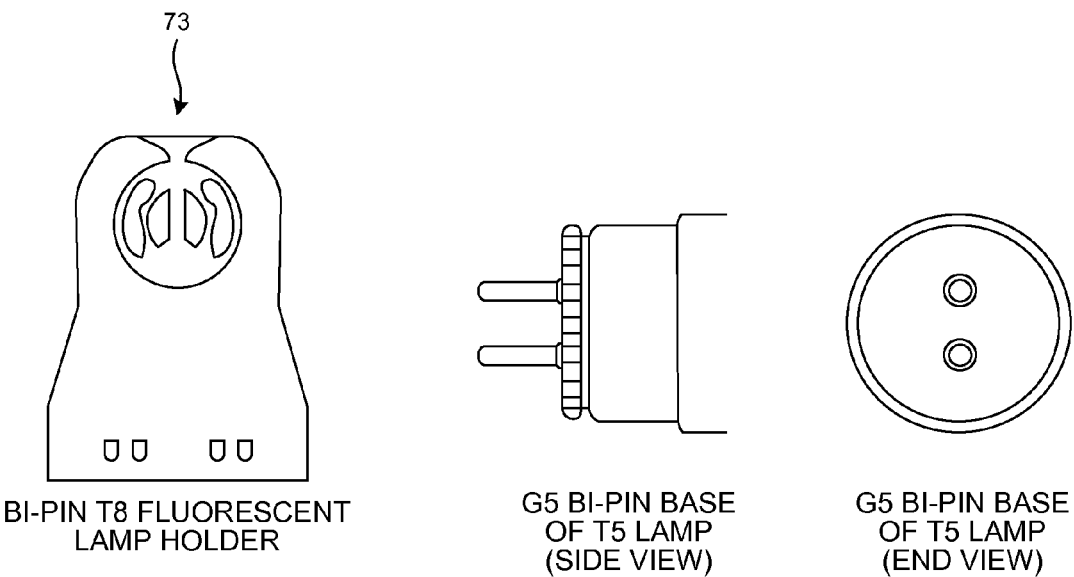
FIG. 9 is an end view looking into the contacts of one of the bi-pin T8 fluorescent lamp holders of FIG. 6.
FIG. 10 is a side view of the leftmost G5 bi-pin base of the T5 fluorescent lamp 99 that is mounted in the retrofit assembly of FIG. 6.
FIG. 11 is an end view of the G5 bi-pin base of FIG. 10.

FIG. 9 is an end view looking into the contacts of the bi-pin T8 fluorescent lamp holder 73 of the legacy fixture of FIG. 6. An end view looking into the contacts of the bi-pin T5 fluorescent lamp holder 97 of the retrofit assembly is similar but it is a smaller dimension to accommodate the smaller pin spacing between the bi-pins of a T5 lamp.

FIG. 10 is a side view of the leftmost G5 bi-pin base of the T5 fluorescent lamp 99 of the retrofit assembly of FIG. 6.

FIG. 11 is an end view of the G5 bi-pin base of FIG. 10.

Figure 12:
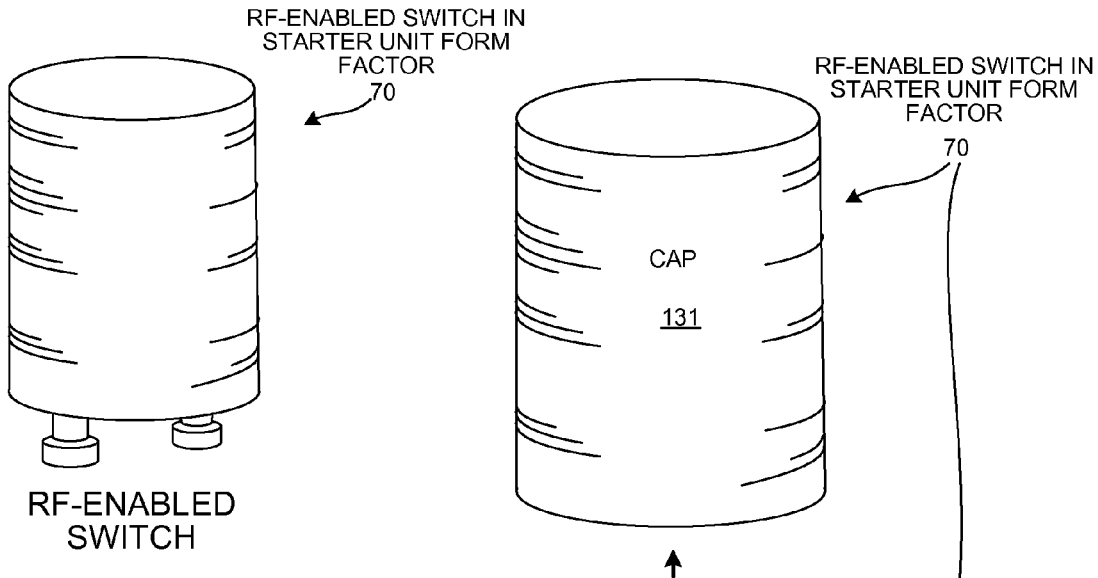
FIG. 12 is a perspective view of the RF-enabled switch of FIG. 6.

FIG. 12 is a perspective view of the RF-enabled switch 70 of FIG. 6.

Figure 13:
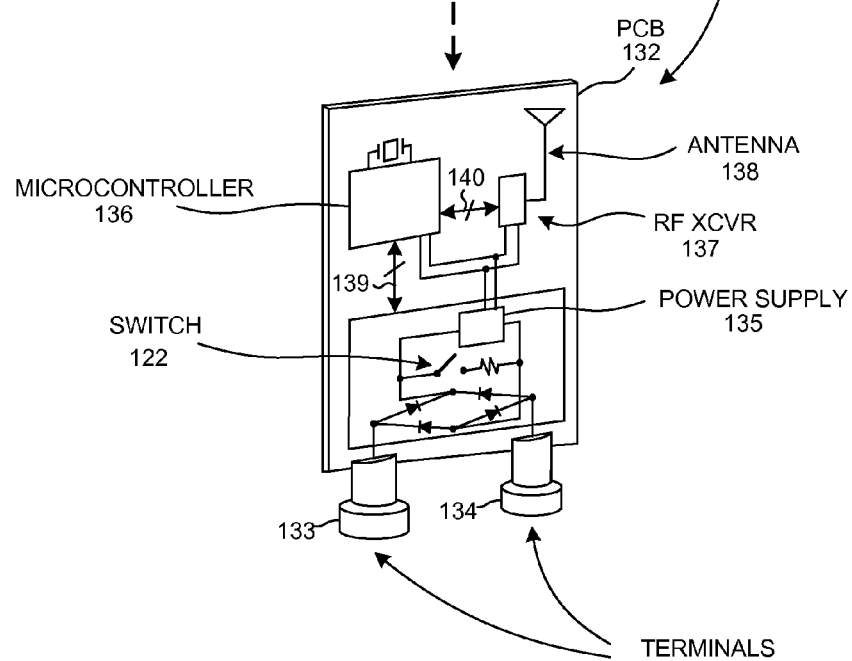
FIG. 13 is an exploded view of the RF-enabled switch of FIG. 6.

FIG. 13 is an exploded view of the RF-enabled switch 70 of FIG. 6. RF enabled switch 70 includes a plastic cap 131 through which propagating RF electromagnetic signals can pass, a printed circuit board 132, and terminals 133 and 134. Terminals 133 and 134 of RF-enabled switch 70 are positioned to make electrical contact with contacts 128 and 129 of socket 72. Circuitry on the printed circuit board 132 includes switch 122, a power supply 135, a microcontroller 136, an RF transceiver 137, an antenna 138, and other components. Power supply 135 receives power from terminals 133 and 134 (due to ballast 141 supplying 5.0 volt DC between wires 76 and 77), generates a regulated DC supply voltage, and supplies the regulated DC supply voltage to microcontroller 136 and to transceiver 137. Microcontroller 136 controls the state of switch 122 via one of the signal lines 139. Microcontroller 136 communicates wirelessly via signal lines 140, RF transceiver 137 and antenna 138. For additional background information on such an RF-enabled switch, see: U.S. patent application Ser. No. 12/803,308, entitled "Alternating Turn Off Timing Of A Fluorescent Lamp Starter Unit", filed Jun. 22, 2010, by Tran et al. (the entire contents of which is incorporated herein by reference). Rather than controlling switch 122 to turn off and to turn on a fluorescent lamp directly as described in application Ser. No. 12/803,308, the switch 122 in the circuit of FIG. 7 is turned off and on by the same microcontroller controlled mechanism but the turning on and off of switch 122 modulates digital information in serial fashion onto wire 77 of FIG. 7. Wire 76 is considered to carry a relative ground potential for the signal on wire 77.

FIG. 14 is a flowchart of a method 200 in accordance with one novel aspect. A multi-bit digital signal is received (step 201) in serial fashion onto a contact of a fluorescent lamp holder.

FIG. 15 is a flowchart of a method 300 in accordance with one novel aspect. A multi-bit digital signal is received (step 301) in serial fashion onto a pin of a fluorescent lamp base.

FIG. 16 is a flowchart of a method 400 in accordance with one novel aspect. A multi-bit digital signal is sent (step 401) in serial fashion out of a contact of a fluorescent lamp holder.

FIG. 17 is a flowchart of a method 500 in accordance with one novel aspect. A multi-bit digital signal is sent (step 501) in serial fashion out of a pin of a fluorescent lamp base.

FIG. 18 is a flowchart of a method 600 in accordance with one novel aspect. Power is supplied (step 601) to a circuit via two conductive paths. In one example, a first conductive path extends from a first bi-pin fluorescent lamp base pin, through a first fluorescent lamp holder contact, through a first contact of a starter unit socket, and to the circuit. A second conductive path extends from a second bi-pin fluorescent lamp base pin, through a second fluorescent lamp holder contact, through a second contact of the starter unit socket, and to the circuit. A multi-bit digital signal is received (step 602) in serial fashion from the circuit via at least one of the two conductive paths. In response to the multi-bit digital signal, a corresponding indicated action is performed (step 603). The action corresponds to a value of the multi-bit digital signal. In one example of the method 600, the supplying of step 601, the receiving of step 602, and the performing of step 603 are performed by the T8-to-T5 retrofit assembly 68 of FIG. 6.

Although certain specific embodiments are described above for instructional purposes, the teachings of this patent document have general applicability and are not limited to the specific embodiments described above. Although embodiments are described above in which the legacy fixture has T8 lamp holders, the legacy fixture into which the novel retrofit assembly and RF-enabled switch are installed may have fluorescent lamp holders of another type or another size. The legacy fixture may be fashioned to hold any one of many different styles and types of fluorescent lamps. The novel retrofit assembly may likewise be of an appropriate form factor and may have suitable connections so that the retrofit assembly can be used in place of any such fluorescent lamp. Although an embodiment of the novel retrofit assembly is described above in which the lighting element of the retrofit assembly is removable and is a fluorescent lamp, the lighting element of the retrofit assembly in some embodiments is not be removable and is not a fluorescent lamp. Moreover, the use of an existing starter socket of a legacy fixture as a communication port through which multi-bit digital control information is communicated into and/or out of the fixture in serial fashion is not limited to use with a retrofit assembly. Accordingly, various modifications, adaptations, and combinations of various features of the described embodiments can be practiced without departing from the scope of the invention as set forth in the claims.

What is claimed is:

1. A retrofit lamp assembly adapted to hold and to power a lamp, the retrofit lamp assembly comprising:
 a first bi-pin base having a first pin and a second pin;
 a second bi-pin base having a first pin and a second pin;
 a contact for making electrical contact to the lamp; and
 a lamp drive circuit having a first AC power input, a second AC power input, a first digital signal input, and a second digital signal input, wherein the first AC power input is coupled to the first pin of the first bi-pin base, wherein the second AC power input is coupled to the first pin of the second bi-pin base, wherein the first digital signal input is coupled to the second pin of the first bi-pin base, wherein the second digital signal input is coupled to the second pin of the second bi-pin base, and wherein the lamp drive circuit is adapted to supply power to the lamp via the contact.

2. The retrofit assembly of claim 1, wherein the contact is a contact of a fluorescent lamp holder.

3. The retrofit assembly of claim 1, wherein the lamp drive circuit comprises an electronic ballast.

4. The retrofit assembly of claim 1, wherein the first and second pins of the first bi-pin base extend away from the second bi-pin base, wherein the first and second pins of the second bi-pin base extend away from the first bi-pin base, and wherein the first and second bi-pin bases are oriented with respect to one another such that the retrofit assembly has the approximate form factor of a T8 fluorescent lamp.

5. The retrofit assembly of claim 1, wherein the lamp drive circuit receives a multi-bit digital control signal in serial fashion via at least one of the second pin of the first bi-pin base and the second pin of the second bi-pin base, and wherein the multi-bit digital control signal is not communicated through either the first pin of the first bi-pin base or the first pin of the second bi-pin base.

6. The retrofit assembly of claim 5, wherein the retrofit lamp assembly sources a DC (direct current) voltage onto the second pin of the second bi-pin base, wherein the DC voltage is sourced through a resistance, and wherein the DC voltage is relative to ground potential on the second pin of the first bi-pin base.

7. The retrofit assembly of claim 5, wherein the lamp drive circuit decodes the multi-bit digital control signal and in response stops current flow through the contact.

8. The retrofit assembly of claim 5, wherein the lamp drive circuit decodes the multi-bit digital control signal and in response stops current flow through the lamp.

9. The retrofit assembly of claim 1, wherein the lamp is a T5 fluorescent lamp, wherein the contact is a contact of a first T5 fluorescent lamp holder, wherein the retrofit lamp assembly further comprises a second T5 fluorescent lamp holder, and wherein the first and second T5 fluorescent lamp holders are spaced and oriented with respect to one another so that they can hold the T5 fluorescent lamp.

10. The retrofit assembly of claim 1, wherein the lamp is taken from the group consisting of: a fluorescent lamp, a LED (Light Emitting Diode) lamp, an incandescent lamp.

11. A method involving a retrofit fluorescent lamp assembly, wherein the retrofit fluorescent lamp assembly comprises a first bi-pin base and a second bi-pin base, wherein the first bi-pin base comprises a first pin and a second pin, and wherein the second bi-pin base comprises a first pin and a second pin, the method comprising:
receiving a multi-bit digital signal in serial fashion onto the retrofit fluorescent lamp assembly via the second pin of the second bi-pin base, wherein the retrofit fluorescent lamp assembly is coupled to a lamp; and
changing a state of the lamp in response to the receiving of the multi-bit digital signal, wherein the changing of the state of the lamp is taken from the group consisting of: changing the state of the lamp from a non-illuminated state to an illuminated state, and changing the state of the lamp from an illuminated state to an non-illuminated state.

12. The method of claim 11, wherein the multi-bit digital signal is a voltage signal whose voltage is relative to a voltage present on the second pin of the first bi-pin base of the retrofit fluorescent lamp assembly.

13. The method of claim 12, further comprising:
supplying power out of the retrofit fluorescent lamp assembly via the second pin of the second bi-pin base and the second pin of the first bi-pin base.

14. The method of claim 12, further comprising:
receiving AC power onto the retrofit fluorescent lamp assembly via the first pin of the first bi-pin base and the first pin of the second bi-pin base, wherein the multi-bit digital signal is not communicated across the first pin of the first bi-pin base and is not communicated across the first pin of the second bi-pin base.

15. The method of claim 12, wherein the lamp is powered, and wherein no power that powers the lamp is received onto the retrofit fluorescent lamp assembly via either the second pin of the first bi-pin base or the second pin of the second bi-pin base.

16. The method of claim 11, wherein the lamp is taken from the group consisting of: a fluorescent lamp, an LED (Light Emitting Diode) lamp, an incandescent lamp.

17. A retrofit lamp assembly adapted to hold and to power a light emitting element, the retrofit lamp assembly comprising:
a first bi-pin base having a first pin and a second pin;
a second bi-pin base having a first pin and a second pin; and
means for receiving AC power onto the retrofit lamp assembly via the first pin of the first bi-pin base and the first pin of the second bi-pin base, for receiving a multi-bit digital control signal in serial fashion onto the retrofit lamp assembly via the second pin of the first bi-pin base and the second pin of the second bi-pin base, for causing the light emitting element to be turned on if the multi-bit digital control signal has a first value, and for causing the light emitting element to be turned off if the multi-bit digital control signal has a second value.

18. The retrofit lamp assembly of claim 17, wherein the means comprises a base member, a digitally controllable electronic ballast mounted to the base member, and associated wiring, and wherein the light emitting element is taken from the group consisting of: a fluorescent light emitting element, an LED (Light Emitting Diode), an incandescent light emitting element.

19. The retrofit lamp assembly of claim 17, wherein the multi-bit digital control signal is a voltage signal present on the second pin of the second bi-pin base, and wherein the voltage of the voltage signal is relative to ground potential on the second pin of the first bi-pin base.

20. The retrofit lamp assembly of claim 19, wherein the means is also for sourcing a DC (direct current) voltage through a resistance onto the second pin of the second bi-pin base.

* * * * *